United States Patent
Alanara et al.

(10) Patent No.: US 8,831,646 B2
(45) Date of Patent: Sep. 9, 2014

(54) APPARATUS, METHOD AND COMPUTER PROGRAM PRODUCT PROVIDING IDLE MODE DISCONTINUOUS RECEPTION

(75) Inventors: Seppo Matias Alanara, Oulu (FI); Lars Dalsgaard, Oulu (FI); Jarkko Tuomo Koskela, Oulu (FI)

(73) Assignee: Nokia Corporation, Espoo (FI)

( * ) Notice: Subject to any disclaimer, the term of this patent is extended or adjusted under 35 U.S.C. 154(b) by 651 days.

(21) Appl. No.: 12/665,398

(22) PCT Filed: Jun. 19, 2008

(86) PCT No.: PCT/IB2008/052429
§ 371 (c)(1),
(2), (4) Date: Jul. 1, 2010

(87) PCT Pub. No.: WO2008/155739
PCT Pub. Date: Dec. 24, 2008

(65) Prior Publication Data
US 2010/0279715 A1    Nov. 4, 2010

Related U.S. Application Data

(60) Provisional application No. 60/936,373, filed on Jun. 19, 2007, provisional application No. 60/964,628, filed on Aug. 14, 2007.

(51) Int. Cl.
*H04W 68/00* (2009.01)
*H04W 68/02* (2009.01)

(52) U.S. Cl.
CPC ................................... *H04W 68/02* (2013.01)
USPC ........... 455/458; 455/464; 455/466; 455/515; 455/574; 340/7.1; 340/7.2

(58) Field of Classification Search
USPC .......... 455/343.2–343.5, 414.1, 426.1, 432.1, 455/434, 435.1, 436, 440, 442–444, 458, 455/464, 466, 515, 574; 370/38.3, 311, 370/329, 330, 331, 337, 338, 342; 340/7.1, 340/7.2, 7.21, 7.28, 7.32–7.35
See application file for complete search history.

(56) References Cited

U.S. PATENT DOCUMENTS 5,854,977 A * 12/1998 Oksanen et al. ............... 455/417
6,044,069 A * 3/2000 Wan ............................. 370/311
(Continued)

FOREIGN PATENT DOCUMENTS

EP          1608195 A     12/2005
WO     2004/013978 A      2/2004
(Continued)

OTHER PUBLICATIONS

International Search Report and Written Opinion received in corresponding Patent Cooperation Treaty Application No. PCT/IB2008/052429, Feb. 11, 2009, 10 pages.

(Continued)

*Primary Examiner* — Justin Lee
(74) *Attorney, Agent, or Firm* — Harrington & Smith

(57) ABSTRACT

A network sends an indication of discontinuous reception period (ldle_Mode_DRX_Period) and an indication of number of paging groups (Paging_Group_Count). Paging occasions for a user equipment are determined by a predetermined formula. One exemplary formula is SFN mod IDLE_Mode_DRX_Period=(IDLE_Mode_DRX_Period div Paging_Group_Count) *(ID) mod (Paging_Group_Count); where SFN is system frame number and ID is the identifier of the user equipment, which can be IMSI or some value derived from IMSI. The UE's temporary ID is sent during a determined paging occasion, which maps to a paging channel on which the page is sent. Options for restricting the paging occasion to less than a frame, and for offsetting the paging occasions from that of the above formula are detailed.

18 Claims, 4 Drawing Sheets

(56) References Cited

U.S. PATENT DOCUMENTS

| | | | |
|---|---|---|---|
| 6,067,460 A * | 5/2000 | Alanara et al. | 455/574 |
| 6,108,542 A * | 8/2000 | Swanchara et al. | 455/434 |
| 6,119,002 A * | 9/2000 | Alanara | 455/434 |
| 7,212,843 B2 * | 5/2007 | Boos et al | 455/574 |
| 7,340,251 B1 * | 3/2008 | McClure | 455/434 |
| 7,664,069 B2 * | 2/2010 | Bae et al. | 370/329 |
| 7,917,183 B2 * | 3/2011 | Ryu et al. | 455/574 |
| 2004/0023672 A1 * | 2/2004 | Terry | 455/458 |
| 2004/0229605 A1 * | 11/2004 | Hwang et al. | 455/426.1 |
| 2004/0254980 A1 * | 12/2004 | Motegi et al. | 709/203 |
| 2005/0176474 A1 * | 8/2005 | Lee et al. | 455/574 |
| 2005/0272481 A1 * | 12/2005 | Kim | 455/574 |
| 2005/0288040 A1 * | 12/2005 | Charpentier et al. | 455/458 |
| 2006/0116136 A1 * | 6/2006 | Noma | 455/458 |
| 2007/0060175 A1 * | 3/2007 | Park et al. | 455/458 |
| 2007/0218899 A1 * | 9/2007 | Kim | 455/434 |
| 2008/0076359 A1 * | 3/2008 | Charpentier et al. | 455/63.1 |
| 2008/0188247 A1 * | 8/2008 | Worrall | 455/458 |

FOREIGN PATENT DOCUMENTS

| | | | |
|---|---|---|---|
| WO | WO 2007048470 A1 * | 5/2007 | |
| WO | WO 2007066875 A2 * | 6/2007 | |

OTHER PUBLICATIONS

LG Electronics, "Transmission of LTE Paging", 3GPP TSG-RAN WG #58, R2-072811, Orlando, United States, Jun. 25-29, 2007, 3 pages.

IP Wireless, "Paging Group Indication", 3GPP TSG RAN WG2 #58, R2-071927, Kobe, Japan, May 7-11, 2007, 3 pages.

LG Electronics, "Transmission of LTE Paging", 3GPP TSG-RAN WG #58, R2-071926, Kobe, May 7-11, 2007, 3 pages.

Samsung, "Idle Mode Paging", 3GPP TSG-RAN WG #58, R2-071904, Kobe, May 7-11, 2007, 4 pages.

3GPP TS 25.133 v5.1.0, "Technical Specification Group Radio Access Networks; Requirements for Support of Radio Resource Management", Release 5, Dec. 2001, 143 pages.

3GPP TS 25.304 v9.2.0, "Technical Specification Group Radio Access Networks; Technical Specification Group Radio Access Network; User Equipment (UE) Procedures in Idle Mode and Procedures for Cell Reselection in Connected Mode", Release 9, Jun. 2010, 50 pages.

3GPP TS 45.002 v8.0.0, "Technical Specification Group GSM/EDGE; Radio Access Network; Multiplexing and Multiple Access on the Radio Path", Release 9, Dec. 2008, 105 pages.

3GPP TSG-RAN2 Meeting #58b, R2-072513, Jun. 25-29, 2007, Orlando, USA (4 pages).

3GPP TSG-RAN WG2 #58bis, R2-072709, Jun. 25-29, 2007, Orlando, USA (2 pages).

3GPP TSG-RAN2 Meeting #62, R2-082831, May 5-9, 2008, Kansas City, USA (6 pages).

3GPP TSG-RAN2 Meeting #62, R2-082830, May 5-9, 2008, Kansas City, USA (24 pages).

* cited by examiner

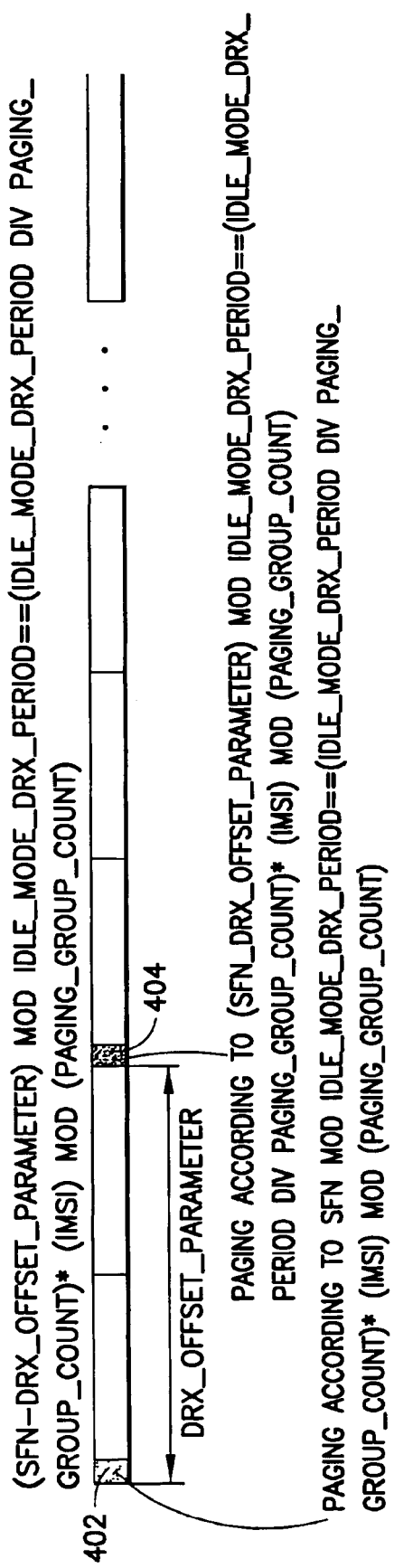
FIG. 4
FIG. 5
FIG. 6

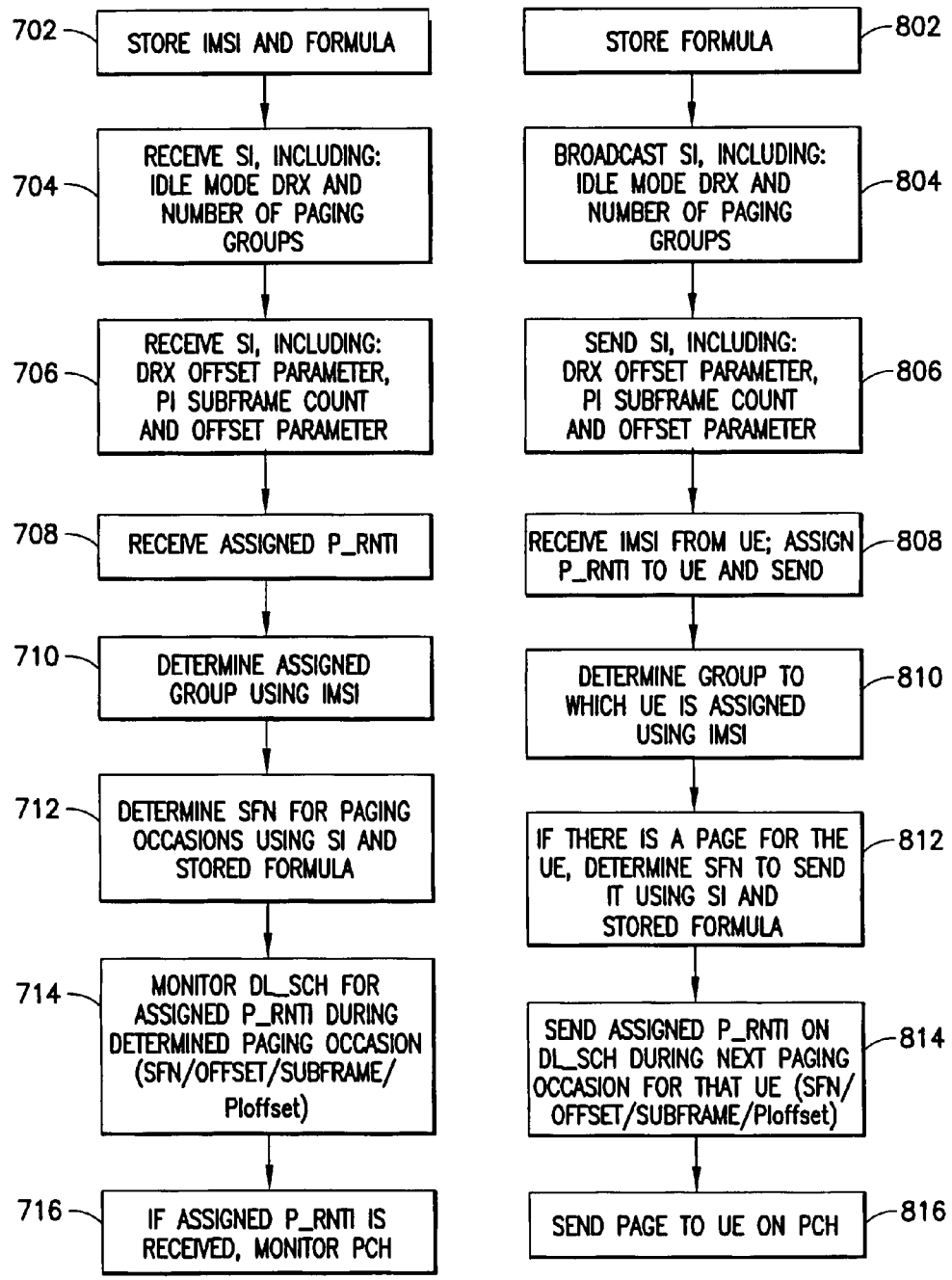

APPARATUS, METHOD AND COMPUTER PROGRAM PRODUCT PROVIDING IDLE MODE DISCONTINUOUS RECEPTION

RELATED APPLICATION

This application was originally filed as PCT Application No. PCT/IB2008/052429 filed Jun. 19, 2008, which claims priority to U.S. Provisional Application No. 60/936,373 filed Jun. 19, 2007, and U.S. Provisional Application No. 60/964,628 filed Aug. 14, 2007.

TECHNICAL FIELD

The exemplary and non-limiting embodiments of this invention relate generally to wireless communications systems and, more specifically, relate to discontinuous reception periods that may be used for example to page a mobile user equipment.

BACKGROUND

The following abbreviations are herewith defined:
3GPP third generation partnership project
AT allocation Table (=PDCCH, on the L1/L2 control channel)
DL downlink
DL-SCH downlink shared channel of E-UTRAN
DRX discontinuous reception
eNB evolved nodeB (of an LTE system)
E-UTRAN evolved UTRAN
GSM global system for communications
IMSI international mobile subscriber identity (64 bits)
LA location Area
LTE long term evolution of 3GPP (3.9G)
Node B base station or similar network access node
OFDM orthogonal frequency division multiplex
PDCCH physical downlink control channel (L1/L2 control channel)
PG_RNTI/P_RNTI paging-RNTI
PLMN public land mobile network
RAT radio access technology
RNTI radio network temporary identifier (16 bits)
RRC radio resource control
SI-RNTI system information-RNTI
SIB system information block
SU scheduling unit
TA tracking Area
TTI transmission time interval
UE user equipment (e.g., mobile equipment/station)
UL uplink
UMTS universal mobile telecommunications system
UTRAN UMTS terrestrial radio access network Relevant to this invention is the discontinuous reception DRX periods during which a mobile terminal or other user equipment is allowed to power down (sleep or idle mode) and the network knows not to send transmissions to that mobile terminal. Other active periods are synchronized to this DRX period, often to very close tolerances to avoid wasting air interface resources. For example, the network often will send a resource allocation (e.g., AT or PDCCH) to the mobile terminal in the transmission time interval immediately following the end of the terminal's DRX period. The DRX concept is an important power-conservation strategy for the mobile terminals, as their sleep or idle mode requires very little power.

The specific detailed description is in the context of 3.9G mobile communications, also known as LTE or E-UTRAN or system architecture evolution SAE. 3.9G is a radio access technology (RAT) planned as a new radio access replacing and upgrading the 3G WCDMA (wideband code division multiple access) UTRAN radio access network. Though described in view of 3.9G, many current wireless systems use the DRX concept and can benefit from these teachings, as will future systems that employ discontinuous reception at the mobile equipment. For example, the GERAN system uses a paging period (see 3GPP TS 45.002) and legacy UTRAN (3G) uses paging and idle mode DRX (see 3GPP TS 25.331 and TS 25.304).

FIG. 1 is a general overview of the DRX concept in E-UTRAN for a single mobile terminal. The physical downlink control channel PDCCH gives resource allocations (an AT) to multiple mobile terminals for resources in the uplink and downlink shared channels (shown as packet data channel PDCH). More than one consecutive PDCCH may be used (the duty cycle or 'on-duration') while in the RRC connected mode, but the overall schedule repeats after each DRX.

The LTE radio access network eNBs broadcast system information for terminals. System Information consists of NAS (Non Access Stratum) and AS (Access Stratum) system information. The AS part includes, among other information, idle and active mode system information which is needed in accessing the network including neighbor RAT and neighbor channel information and configuration of terminal measurements to be used in idle and active modes. The NAS portion includes, among other information, parameters of the LA, TA, PLMN identity and PLMN types that may be reached from the serving RAT.

The mobile terminal receives/reads the relevant system information of the serving eNB before accessing the system for several reasons. The system information enables the mobile terminal to optimize the radio access, to recognize if the cell access is restricted by the operator, and to determine if the terminal has access rights in the cell. The PLMN identity information tells if the network is the home network or a visited network, and gives the mobile terminal additional information.

But even if the mobile terminal (UE) has no need to access the system, it still needs to synchronize to the DL_SCH and align to the idle mode DRX of the eNB in order to receive possible paging messages from network.

One of the parameters needed in idle mode terminal is the idle mode DRX period so that UE and eNB have a synchronized paging occasion. Additionally, if grouping of UE paging messages is applied, there are further parameters concerning grouping information that all of the grouped UEs need for their idle mode. The current assumption in LTE is that paging indications are sent in the L1/L2 control channel (e.g., PDCCH, see FIG. 1) using a dedicated RNTI value. In various discussions this dedicated RNTI may be named P_RNTI or PG_RNTI. The UEs having a paging occasion at a predetermined time then check the L1/L2 control channel for the occurrence of the dedicated PRNTI/PGRNTI. If a P_RNTI/PG_RNTI match is found, the UEs proceed to read the paging message (e.g., on the paging channel PCH). Allocation for PCH is given in PDCCH and is mapped to the DL_SCH.

Now, a problem arises in the distribution of all of the DRXs of the various UEs relative to the DL_SCH. The DRXs for different UEs should be distributed such that the eNB scheduler has optimal access to the DL_SCH and is able to multiplex the PCH and all DL packet bearers.

In UTRAN (3G) the solution for the distribution has been based on a separate channel, termed the PICH or paging indicator control channel, and the assignment of the UEs to specific PICH bit positions by a mod formula with the IMSI. In UTRAN there is also a separate PCH channel and thus the paging does not use the general DL resources. In E-UTRAN, there is no PICH and the PCH is mapped to the DL_SCH with data for other UEs.

Three solutions have been proposed in discussions for LTE development. Document R2-071904 (3GPP TSG-RAN2 Meeting #58; Kobe, Japan; 7-11 May 2007) entitled "IDLE-MODE PAGING" by Samsung proposes that there is no need for paging groups in LTE. Document R2-071926 (3GPP TSG-RAN2 Meeting #58; Kobe, Japan; 7-11 May 2007) entitled "TRANSMISSION OF LTE PAGING" by LG Electronics proposes to use paging groups indicated by redundant L1/L2 control channel bits. Document R2-071927 (3GPP TSG-RAN2 Meeting #58; Kobe, Japan; 7-11 May 2007) entitled "PAGING GROUP INDICATION" by IPWireless proposes that several paging groups can be indicated by having several hierarchical P_RNTI.

As discussed in document R2-072513 (3GPP TSG-RAN2 Meeting #58b; Orlando, USA; 25-29 Jun. 2007; entitled "IDLE MODE PAGING"; by Samsung), LTE offers a 10-fold increase in potential paging occasions as paging may be performed on subframe basis. More paging occasions per radio frame will allow for smaller paging groups and possibly smaller paging messages. This may lower the effort for the UE to decode the paging message. The signaling overhead however will increase. A low number of paging occasions per radio frame can reduce signaling and also simplify scheduler decisions at the cost of more UEs per paging group.

From a UE standby power consumption point of view, it is advantageous to have a specific frame or even subframe where the UEs can check their paging when in the idle mode. Presently LTE assumes that paging groups (where multiple UEs can be addressed) are used on the L1/L2 signaling channel, that the precise UE identity is found on the PCH, and that the idle period/DRX is UE specific.

In the LTE network there is no need to have any grouping for UEs except to help the Node B scheduler in sharing the DL-SCH for all U-plane (user) and C-plane (control) packet flows. In the UEs, paging groups may help in decreasing UE standby power consumption as the UE's reception period is statistically shorter when there are less frequent paging indications and thus less PCH access linked to the paging occasions.

There seems to be a consensus in LTE discussions that there will be at least one special P-RNTI value. UEs which detect the P-RNTI on the L1/L2 control channel in their particular paging occasion will then read the PCH. Proposals have been given to have multiple RNTIs for paging indications, and this RNTI set is divided among all the UEs.

It is anticipated that paging groups will continue to be a valuable option in LTE. What is needed in the art is a simpler implementation for paging groups in LTE, preferably without using the redundant bits in the L1/L2 control channel as in document R2-071926 and leaving those bits available for future use.

SUMMARY

In accordance with an exemplary embodiment of the invention is a method that includes receiving an indication of discontinuous reception period and an indication of number of paging groups, determining paging occasions for a user equipment by applying the discontinuous reception period and the number of paging groups and an identifier of the user equipment to a predetermined formula, monitoring a control channel during the determined paging occasions. In one particular embodiment for the case where the user equipment is identified on the monitored control channel during one of the paging occasions, the user equipment receives a page and sends a response to the page. In another particular embodiment that may be combined with the one particular embodiment noted above, the predetermined formula is: SFN mod IDLE_Mode_DRX_Period=(IDLE_Mode_DRX_Period div Paging_Group_Count)*(ID) mod (Paging_Group_Count); where SFN represents system frame number, Idle_Mode_DRX_Period represents the discontinuous reception period, Paging_Group_Count represents the number of paging groups, and ID represents the identifier of the user equipment, which as detailed below can be the international mobile subscriber identity of the user equipment or a value derived from the international mobile subscriber identity such as IMSI-mod128.

In accordance with still another exemplary embodiment of the invention is an apparatus that includes a receiver and a processor. The receiver is configured to receive an indication of discontinuous reception period and an indication of number of paging groups. The processor is configured to determine paging occasions for the apparatus by applying the discontinuous reception period and the number of paging groups and an identifier of the apparatus to a predetermined formula. The receiver is further configured to monitor a control channel during the determined paging occasions. In one particular embodiment for the case where the apparatus is identified on the monitored control channel during one of the paging occasions, the receiver is configured to receive a page, and the apparatus further includes a transmitter that is configured to send a response to the received page.

In accordance with yet another exemplary embodiment of the invention is a memory embodying a computer program that is executable by a digital processor to perform actions directed to monitoring for a page. In this embodiment the actions include, in response to receiving indications of a discontinuous reception period and of a number of paging groups, determining paging occasions for a user equipment by applying the discontinuous reception period and the number of paging groups and an identifier of the user equipment to a predetermined formula, and monitoring a control channel during the determined paging occasions.

In accordance with another exemplary embodiment of the invention is an apparatus that includes radio means (for example, a radio receiver or a transceiver) and processing means (for example, a digital processor). The radio means is for receiving an indication of discontinuous reception period and an indication of number of paging groups. The processing means is for determining paging occasions for the apparatus by applying the discontinuous reception period and the number of paging groups and an identifier of the apparatus to a predetermined formula. The radio means is also for monitoring a control channel during the determined paging occasions.

In accordance with still another exemplary embodiment of the invention is a method that includes transmitting an indication of discontinuous reception period and an indication of number of paging groups, assigning a temporary identifier to a user equipment, determining at least one paging occasion for the user equipment by applying the discontinuous reception period and the number of paging groups and another identifier of the user equipment to a predetermined formula, and sending the assigned temporary identifier on a control channel during the determined at least one paging occasion.

In accordance with yet another exemplary embodiment of the invention is an apparatus that includes a transmitter and a processor. The transmitter is configured to transmit an indication of discontinuous reception period and an indication of number of paging groups. The processor is configured to assign a temporary identifier to the user equipment and to determine at least one paging occasion for the user equipment by applying the discontinuous reception period and the number of paging groups and another identifier of the user equipment to a predetermined formula. Further, the transmitter is also configured to send the assigned temporary identifier on a control channel during the determined at least one paging occasion.

BRIEF DESCRIPTION OF THE DRAWINGS

Embodiments of the invention are detailed below with particular reference to the attached drawing Figures.

FIG. 4 is a schematic timing diagram similar to FIG. 3 but showing an additional DRX offset for paging occurrences according to an embodiment of the invention.

FIG. 5 is a schematic timing diagram similar to FIG. 3 but abbreviated, and showing an additional paging indication subframe count for paging occurrences according to an embodiment of the invention.

FIG. 6 is a schematic timing diagram similar to FIG. 5 showing an additional paging indication subframe offset for paging occurrences according to an embodiment of the invention.

FIG. 7 is a series of process/method steps executed by a UE according to an embodiment of the invention.

FIG. 8 is a series of process/method steps executed by a network element/eNB according to an embodiment of the invention.

DETAILED DESCRIPTION

Embodiments of this invention are particularly advantageous for use in an E-UTRAN/LTE system though as noted above are not limited to that particular system and may be used in any wireless communication system that uses the DRX concept, whether termed a DRX or sleep mode or idle mode or otherwise. As will be seen, embodiments of this invention enable the paging occasions (times when the UE monitors for a page) for the various UEs in a cell to be distributed across a wide number of frames (or subframes or other air interface time interval in use) that are not necessarily consecutive with one another in a manner that is quite simple to implement and that uses a fairly minimal amount of control signalling. Certain optional features enable the paging instances to be positioned at essentially any location within the frame/subframe structure, where a subset of subframes of one radio frame to be used for paging occasions can be indicated.

Instead of multiple paging RNTIs as noted above in background, the solution provided herein is to use a network provided parameter indicating the amount of paging groups, and the UEs will be allocated to these groups by a common equation which also determines the paging occasions based on the UE's IMSI. Then in addition to the parameter specifying the paging occasion grouping of the UEs, the network provides another parameter that defines the maximum period (Idle_Mode_DRX_period) that the UE uses to check the paging.

Figure 1:
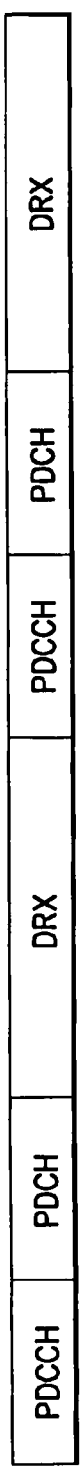
FIG. 1 shows a simplified prior art channel structure for a single mobile terminal in E-UTRAN as context for the description.
Figure 2:
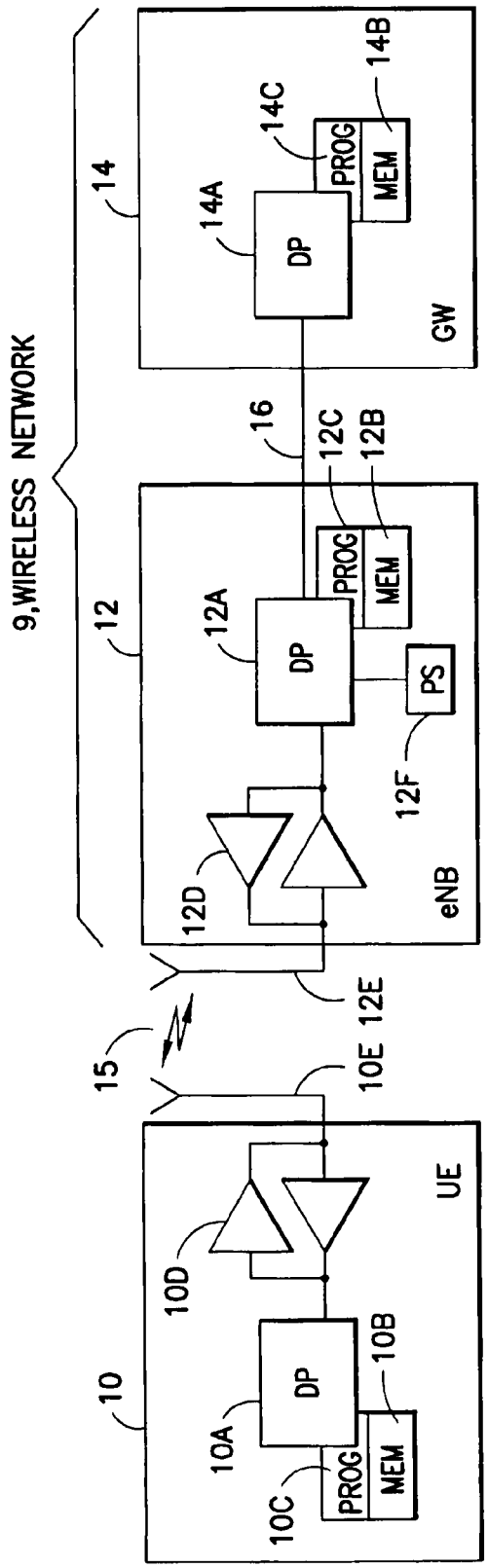
FIG. 2 shows a simplified block diagram of various electronic devices that are suitable for use in practicing the exemplary embodiments of this invention.

Reference is made first to FIG. 2 for illustrating a simplified block diagram of various electronic devices that are suitable for use in practicing the exemplary embodiments of this invention. In FIG. 2 a wireless network 9 is adapted for communication with a UE 10 via a node B (e.g., base station or eNB) 12. The network 1 may include a higher controlling node generically shown as a gateway GW 14, which may be referred to variously as a radio network controller RNC, a user plane entity UPE, a mobility management entity MME, or a system architecture evolution gateway SAE-GW. The GW 14 represents a network node higher in the network than the eNB 12.

The UE 10 includes a data processor (DP) 10A, a memory (MEM) 10B that stores a program (PROG) 10C, and a suitable radio frequency (RF) transceiver 10D for bidirectional wireless communications with the eNB 12, which also includes a DP 12A, a MEM 12B that stores a PROG 12C, and a suitable RF transceiver 12D. The eNB 12 may be coupled via a data path 16 (e.g., Iub or S1) to the serving or other GW 14. Separate from or within the DP 12A of the eNB 12 is a packet scheduler PS 12F for scheduling user data and paging indications for the various UEs in its cell. In systems other than E-UTRAN, the scheduling function may be performed by the GW 14. The eNB 12 and the UE 10 communicate over a wireless link 15, each using one or more antennas 12E, 10E. At least one of the PROGs 10C and 12C is assumed to include program instructions that, when executed by the associated DP, enable the electronic device to operate in accordance with the exemplary embodiments of this invention, as will be discussed below in greater detail.

In general, the exemplary embodiments of this invention may be implemented by computer software executable by the DP 10A of the UE 10 and the other DPs, or by hardware, or by a combination of software and/or firmware and hardware.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 12B may be of any type suitable to the local technical environment and may be implemented using any suitable data storage technology, such as semiconductor-based memory devices, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multi-core processor architecture, as non-limiting examples.

As noted above, embodiments of the invention provide a simple implementation to indicate and synchronize paging occasions in the UEs and the eNB. An embodiment uses a simple formula to do that, for which parameters are signaled to the UEs in the system information. In addition to that a grouping by the given paging occasion formula is used instead of explicit group numbering for the UEs. This will save additionally on the signalling overhead. (In UTRAN/3G the grouping is by the PICH location and may be spread over multiple PICH channels).

In short, the eNB and the UE use the formula, which is stored in their local memory prior to the UE coming under control of the eNB (e.g., written in a standard and stored in software or firmware) in conjunction with parameters wirelessly sent by the eNB and a unique identifier of the UE 10 to determine a time (e.g., system frame number) at which that particular UE 10 will monitor for an indication that it is being paged. These predetermined times are termed paging occasions. In an embodiment, the DL-SCH that the UE monitors during those paging occasions is the physical downlink control channel PDCCH. For E-UTRAN, the eNB 12 sends on the DL-SCH/PDCCH the dedicated P_RNTI for the UE 10 to be paged during one of that UE's paging occasions. Specifically, if the P_RNTI is present in the PDCCH, it also identifies the actual downlink resources on the DL-SCH that is used for paging, and the eNB 12 sends that page over the identified PCH. The UE 10 monitors the DL_SCH/PDCCH during the paging occasions and if it receives its P_RNTI at that time, it then tunes to the PCH, which was identified by the P_RNTI on the PDCCH, to receive its page from the eNB 12. Some DRX idle periods are long (e.g., up to 5.12 sec in UTRAN) and so it is important to be able to 'wake' an idle UE 10 sometimes prior to the end of its DRX idle period.

Specific implementation details are now provided for an embodiment particularly adapted for E-UTRAN. The eNB 12 broadcasts the Idle Mode DRX period and the number of paging groups in system information. The parameters for DRX grouping and timing can be provided in AS or NAS system information. Tracking Area Update signalling is a viable option to readily implement the broadcast of these two parameters.

The eNB 12 determines the number of UE groups there will be in the cell for paging purposes. Term this parameter Paging_Group_Count, represented as $2^n$, where n is selected from $\{0, 1, 2, 3, 4, 5, 6, 7\}$. The Paging_Group_Count parameter therefore requires three bits to signal as the power n. The group to which any individual UE belongs is then IMSI mod Paging_Group_Count, where IMSI is unique to each UE and therefore the UEs will be randomly distributed among the groups. Any other unique identifier may be used, but IMSI is particularly convenient as it is 64 bits long (and so is unique among all UEs in the cell) and would not represent additional signalling to implement. The DRX period is known in E-UTRAN. Designate Idle_Mode_DRX_Period as the parameter signalled by the eNB in system information. In its most basic form, only these two parameters and the IMSI are needed to determine the location at which pages will be sent to the UE 10 associated with that IMSI. That location, or time, is given by a system frame number SFN, which is an index of transmission frames beginning from the end of the last DRX period or the start of the current one (any arbitrary time known in advance to the UE 10 and eNB 12 is operable to count the SFN).

Note that while UE groups are discussed, there is no restriction by these teachings that each group must include a plurality of UEs. Any individual group may include one or even no UEs at a particular time, since group membership depends on the IMSIs of the UEs under control of the eNB 12 at any given time.

Figure 3:
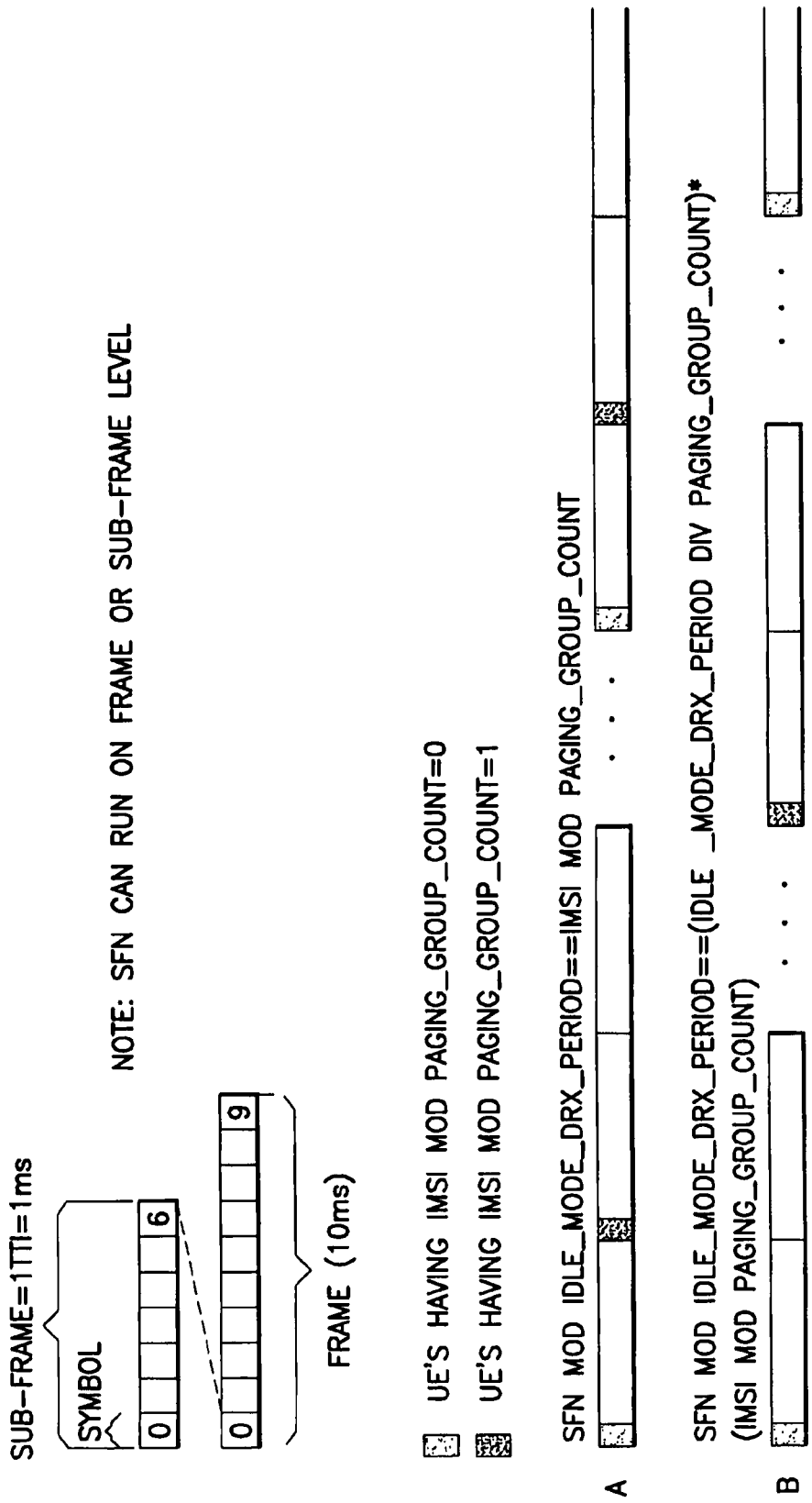
FIG. 3 is a schematic timing diagram showing disposition of paging occurrences for two different groups according to an embodiment of the invention.

The frame and subframe structure for E-UTRAN is given at the top of FIG. 3: one subframe spans 1 msec, which is defined as one transmission time interval TTI, and holds six symbols. Ten consecutive subframes make up one frame. The SFN counting described herein by example can run on the frame or subframe level without departing from these teachings, though note that detailed below are additional subframe options for narrowing the paging occurrence to any single (or more) subframe of a frame.

In a basic form, the formula could be as follows:

$$\text{SFN mod Idle\_Mode\_DRX\_Period} = (\text{IMSI}) \bmod (\text{Paging\_Group\_Count}) \quad [1]$$

For two groups, formula [1] results in the distribution seen at line A of FIG. 3, the paging occurrences for UEs in the two different groups are in consecutive frames, which does not distribute the eNB's pages to them in time if more than one is paged. Formula [2] below is an improvement:

$$SFN \bmod \text{Idle\_Mode\_DRX\_Period} = \left(\frac{\text{Idle\_Mode\_DRX\_Period}}{\text{Paging\_Group\_Count}}\right) * (IMSI) \bmod (\text{Paging\_Group\_Count}) \quad [2]$$

or equivalently $$\text{SFN mod IDLE\_Mode\_DRX\_Period} = (\text{IDLE\_Mode\_DRX\_Period div Paging\_Group\_Count}) * (\text{IMSI}) \bmod (\text{Paging\_Group\_Count}) \quad [2']$$

In equations [2] and [2'], the full length SFN (12 bits—the exact length is yet to be determined in LTE) is used, the UE keeps the SFN synchronization to 12 bits of accuracy (radio frame based counter). As equations [2] and [2'] just determine a radio frame of the possible paging, two alternatives are presented to find the correct subframe: fix the subframe(s) within the radio frame that is used for paging, or alternatively the Node B broadcasts (e.g., in system information) a parameter that defines in which subframe(s) of the radio frame the paging message may be transmitted. Either of these reduces the UE's on-time to a minimum.

The UEs will determine their paging occasion based on a match of the right and the left side of equation [2] or [2']. Thus the parameters that need to be transmitted on a broadcast channel or through dedicated signaling for paging DRX purposes are:

n (e.g., 3 bits): defines the number of paging groups;
(e.g., 3 bits): defines the paging DRX cycle length.
The multiplier $$\left(\frac{\text{Idle\_Mode\_DRX\_Period}}{\text{Paging\_Group\_Count}}\right)$$

distributes the LTE frames used for paging indications, and therefore the UEs to the DL-SCH, as evenly as possible, as seen at row B of FIG. 3 for the same two UE groups. Without it, all UE groups would be assigned to successive DL_SCH frames and this would make it more difficult for the Node B scheduler to allocate the DL-SCH U-plane and C-plane (in this case the PCH) to the DL-SCH. Note that this multiplier distributes as above only if it is larger or equal to 1.

It may be that the Node B is deemed not a secure enough node to store the UE's permanent non-access stratum NAS identity. In this case, to compute the right side of equation [1] or [2]/[2'] the Node B can instead get the value IMSI128=IMSI mod 128 (or generically IMSI mod $2^{(max\ n)}$, where 'max n' is the maximum value of n), which can then be used to compute the value for "(IMSI) mod (Paging_Group_Count)" in the Node B and yields the same result as with the full length IMSI. The value IMSI128 can be sent to the Node B from a higher network note, such as in an LTE S1AP message from the mobility management entity MME to the Node B via the S1 interface (data path 16 of FIG. 2). The Node B paging occasion equation [2] above is then transformed into:

$$SFN \bmod \text{Idle\_Mode\_DRX\_Period} = \qquad [2a]$$
$$\left(\frac{\text{Idle\_Mode\_DRX\_Period}}{\text{Paging\_Group\_Count}}\right) * (IMSI128) \bmod (\text{Paging\_Group\_Count})$$

Using the equivalent format of equation [2'], then the transformation reads as:

SFN mod IDLE_Mode_*DRX*_Period=(IDLE_Mode_
  *DRX*_Period div Paging_Group_Count)*
  ((IMSI128)mod Paging_Group_Count)    [2a']

As can be appreciated, other values derived from IMSI may be substituted for the IMSI term of equations [2]/[2'] without departing from these teachings; IMSI 128 of equations [2a]/[2a'] is simply one example of how the true IMSI might be masked.

Additionally, multiple PI-RNTIs as considered by others in LTE to allow for one or more paging groups to be addressed in the same sub frame. This requires multiple PI-RNTIs in one single L1/L2 control message, as seen at document R2-072709 (3GPP TSG-RAN2 Meeting #58bis; Orlando, USA; 25-29 Jun. 2007) entitled "PAGING PROCEDURE IN LTE" by NTT DoCoMo Inc. and NEC, or even multiple L1/L2 control messages. A single PI-RNTI avoids mapping of UEs to the different PI-RNTIs. Large paging groups can be avoided by multiple paging occasions per radio frame, as discussed the referenced document R2-072513 and above. So embodiments of this invention use only a single P-RNTI to avoid this additional complexity of assigning and mapping the UEs to the different P-RNTIs.

For the case of two paging groups, formula [1] would assign the frames for paging indications as follows so that the paging groups (0 and 1) are in successive frames:
  01 - - - 01 - - - .

With the multiplier as in formula [2]/[2'] the distribution is more even and paging groups (0 and 1) have a gap between them:
  0 - - - 1 - - - 0 - - - 1 - - - .

The parameters in formula [2]/[2'] are:
System Frame Number (SFN), 12 bits in E-UTRAN (though this may change).
Idle_Mode_DRX_Period; represented as $2^i$, where i is an integer from the set {3, 4, 5, 6, 7, 8, 9) and so requiring three bits to signal the power i. The possible values of Idle_Mode_DRX_Period are thus {8, 16, 32, 64, 128, 256, 512}, and corresponds thus to DRX periods of {0.08, 0.16, 0.32, 0.64, 1.28, 2.56 and 5.12} seconds, which are the same as in UTRAN (using the formula DRX cycle length=10 msec*Idle_Mode_DRX_Period).
Paging_Group_Count; represented as $2^n$, where n is an integer selected from the set {0, 1, 2, 3, 4, 5, 6, 7} and needing three bits to signal n as noted above. In this case the maximum value of N is restricted to log 2(Idle_Mode_DRX_Period) so the number of user groups may be {1, 2, 4, 8, 16, 32, 64, 128 or 256} depending on the Idle_Mode DRX_Period.

As seen at FIG. 3, the basic formula [2][2'] distributes the paging occurrences, but with modifications detailed below those paging occurrences can be made even more flexible. By adding another parameter, termed herein a DRX_offset_parameter (which can also be provided through System Information, other signalling, or specified in the wireless standard for the system in use), the paging occasions could be shifted in the SFN by the amount of the DRX offset parameter. Thus, the first group would be located at the SFN for which the mod with Idle_Mode_DRX_Period matches with the offset.

This DRX_offset_paremeter can be incorporated into the equation to yield equation [3]

$$(SFN - \text{DRX\_offset\_parameter}) \bmod (\text{Idle\_Mode\_DRX\_Period}) = \qquad [3]$$
$$\left(\frac{\text{Idle\_Mode\_DRX\_Period}}{\text{Paging\_Group\_Count}}\right) * (IMSI) \bmod (\text{Paging\_Group\_Count}).$$

Similar to equations [2'] and [2a'], this can be equivalently expressed as:

(SFN-*DRX*_offset_parameter)mod(IDLE_Mode_
  *DRX*_Period)=(IDLE_Mode_*DRX*_Period div
  Paging_Group_Count)*(IMSI)mod(Paging_
  Group_Count)    [3']

Of course, for the environment where the Node B does not have IMSI directly, the IMSI term of equation [3]/[3'] may be replaced with IMSI128 as was done between equations [2]/[2'] and [2a]/[2a'] above.

The results are shown in FIG. 4, where the first instance 402 of the paging occurrence is given by equation [2]/[2'] and the second instance 404 of the same paging occurrence for the same UE is given by equation [3]/[3']. In an embodiment, the DRX_offset_parameter may only have values spanning {0, Idle_Mode_DRX_Period-1}. If the DRX_offset_parameter is not sent or has value 0, the result is that no DRX offset is used. The offset shifts all paging occasions by the amount of the offset number. For example, if DRX_offset_parameter=2 and the regular (equation [2]/[2']) paging occasion would be in SFN=0, the DRX_offset_paremeter=2 shifts the paging occasion to SFN=2.

Consider again the top of FIG. 3. Each frame is divided into subframes, ten in E-UTRAN. Considering the above teachings in view of frame indexing with the SFN (rather than the SFN running on the subframe level), then further within the 10 ms frame it is possible to restrict the paging occasions to a subset of sub-frames so that the UEs don't need to check/monitor the entire 10 ms LTE frame for a match with their assigned P_RNTI. To enable this, in an embodiment an additional parameter is provided as a paging indication subframe count, designated herein as PI_subframe_count (PI=Paging indication). This is readily signalled as a bit representation of an integer number within a given range, e.g. (1, 2, 4, 10), where similar to above all that needs to be signaled is an integer power-of-two value to determine how many of the subframes are to be monitored. The last value (10) means that all sub-frames within the frame may be used for paging indications. In the default case the PI_subframe_count indicates how many sub-frames from the first sub-frame of a frame are used, a PI_subframe_count=2 indicates that the UE should monitor the first two subframes of the frame given by the formula in use (equation [2]/[2'] or [3]/[3'] depending on whether frame offset is used). This is seen at FIG. 5, with examples given at 502 for PI_subframe_count=1 and at 504 for PI_subframe_count=4.

Similar in principle to the DRX_offset_parameter, it is possible to have an offset parameter indicating from which sub-frame of a frame the sub-frames allocated for paging indications start. This leaves the preceding subframes in that frame for other uses. This offset is designated herein as the parameter PI_subframe_offset and can be signaled directly to take on the values {1, 2, 3, 4, 5, 6, 7, 8, 9, and 10}. Examples are seen at FIG. 6, where row 602 indicates a zero offset and row 604 indicates an offset of five subframes, so at 604 the subject UE 10 monitors at the sixth subframe of the SFN-computed frame. As above, this parameter may also be implemented by signalling an integer power-of-two value, in which case the subframe offsets would be limited to take on the values {1, 2, 4, and 10}. Rather than this additional signaling, the UEs can be assigned to these allocated sub-frames based on (IMSI mod PI_subframe_count).

It will be understood that the above teachings can be readily adjusted for the TDD mode, given its different DL-SCH structure. Still further, the various names used herein for the DRX-related parameters (e.g., Idle_Mode_DRX_Period, Paging_Group_Count, etc.) are not intended to be limiting in any respect, and these parameters may be identified by any suitable names.

By this invention and particularly the multiplier in formulas [2]/[2'] and [3]/[3'] above, the scheduler 12F in the eNB 12 can more easily plan allocations for the general DL-SCH payload because the paging indications are spread more evenly. The remainder of the DL_SCH payload is scheduled in the AT sent on the PDCCH, and is dynamically varied by the eNB 12. Avoiding paging occasions that are aggregated in a relatively small portion of the frame structure gives that scheduler more flexibility to meet the demands of the data being sent and received over the wireless links to the UEs.

Now with respect to FIGS. 7 and 8 are described particular embodiments using the formula [3] above, in the form:

$$(SFN - DRX\_offset\_parameter) \bmod (2^i) = \left(\frac{2^i}{2^n}\right) * (IMSI) \bmod (2^n) \quad [4]$$

where Idle_Mode_DRX_Period=$2^i$ and Paging_Group_Count=$2^n$, both as detailed above. Equivalently formula [4] may be expressed as:

$$(SFN - DRX\_offset\_parameter) \bmod (2^i) = (2^i) \operatorname{div}(2^n) * (IMSI) \bmod (2^n) \quad [4']$$

FIG. 7 show process blocks followed by a UE 10 according to a particular embodiment of the invention. At 702 the UE 10 stores the formula in use and its IMSI, well prior to initial contact with the serving eNB 12. At 704 the UE 10 receives system information, including the idle mode DRX (integer i) and the number of paging groups (integer n). Alternatively, the variable i may instead be provided by radio resource control RRC signaling or RRC direct transfer messages. At 706 the additional paging occasion parameters are received, including the DRX offset parameter, the PI subframe count parameter and the PI subframe count parameter. At 708 the UE 10 then receives from the eNB 12 its dedicated P_RNTI for use in the cell. In an embodiment, the P_RNTI may be shared between multiple UEs 10 rather than dedicated, and the P_RNTI may be given to the UE already such as in a system information broadcast or other stipulated means and not distributed specifically at block 708 by the serving eNB 12. As noted above, only one P_RNTI may be used for each group of UEs to avoid the additional mapping required if the P_RNTIs were dedicated to individual UEs. At 710 the UE 10 determines its assigned group, using IMSI by computing (IMSI)mod($2^n$). At block 712 the UE 10 determines the time of its paging occasions by formula [4]/[4'] above using the parameters received at 704 and 706, and additionally the subframe(s) within the SFN indicated by that formula. At 714 the UE 10 monitors the DL-SCH(e.g., the PDCCH) during those paging occasions. If during one of them the UE 10 receives its P_RNTI, then at 716 the UE 10 tunes its receiver to the PCH to receive its page.

The eNB 12 performs similarly as seen at FIG. 8. At 802 the eNB 12 stores the formula in use, and at 804-806 broadcasts or otherwise sends the paging occasion parameters noted at blocks 704 and 706 that the UE receives. At 808 the eNB 12 receives the UE's IMSI, and assigns (and sends) to the UE 10 a P_RNTI. Note that in an embodiment the UE 10 does not directly provide its IMSI to the eNB 12, but the eNB 12 can get it or a value derived from the IMSI from a previous serving eNB or the UE's home network via the GW 14 to conserve wireless bandwidth. In a specific embodiment, the GW/MME 14 receives the IMSI from the UE's home network, computes IMSI mod $2^n$, and sends that computed value to the Node B via an S1 message. As above, the eNB 12 may send the P_RNTI via broadcast system information rather than in a dedicated manner, and the P_RNTI is not dedicated to the UE but to the paging group for that UE. At 801 the eNB 12 determines the paging group to which the UE is assigned using the same procedure as at 710 with the received IMSI or value derived from the IMSI. At 812, anytime there is a page for that UE 10, the eNB 12 determines the SFN according to the above formula [4]/[4'] along with any subframe divisions/offsets in use, and at 814 the eNB 12 sends over the DL_SCH (e.g., the PDCCH) the P_RNTI that was assigned at block 808 to that particular UE 10 for which the page is directed. At 816 the eNB 12 then sends the page to the UE 10 on the PCH.

According to an embodiment of the invention there is provided a method, apparatus and computer program embodied on a computer readable memory and executable by a digital processor for, from the UE's perspective, receiving at least two paging occurrence parameters from a network node, for using a predetermined formula to determine one of at least two groups to which the UE is assigned in the cell and to determine paging occasions times in a cell for the one group, where the formula distributes paging occasions for the at least two groups into non-consecutive frames, and for monitoring a designated channel during those paging occurrences for an indication that the UE has a page.

According to another embodiment of the invention there is provided a method, apparatus and computer program embodied on a computer readable memory and executable by a digital processor for, from the network's perspective, to wirelessly send at least two paging occurrence parameters to a UE in a cell, for using a predetermined formula to determine one of at least two groups to which the UE is assigned in the cell and to determine paging occasion times in the cell for the one group, where the formula distributes paging occasions for the at least two groups into non-consecutive frames, and for sending over a designated channel during one of those paging occurrences an indication that the UE has a page. In an embodiment, the Node B receives a value derived from the UE's IMSI from a higher network node, such as the value "IMSI mod 128" for a UE having that IMSI which the Node B receives over a S1 link from a GW/MME.

While described in the context of LTE and DL_SCH/PCH/P_RNTI, it is within the scope of the exemplary embodiments of this invention to use the above described UE 10 and eNB 12 procedures for any type of downlink shared channel paging or signaling as well as in other wireless communication systems such as GSM, GERAN, UTRAN, CDMA, OFDM and the like.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
receiving an indication of a discontinuous reception period and an indication of a number of paging groups;
determining paging occasions for a user equipment by applying the indicated discontinuous reception period, the indicated number of paging groups and an identifier of the user equipment to a predetermined formula; and
monitoring a control channel during the determined paging occasions,
wherein the predetermined formula comprises:

SFN mod IDLE_Mode_*DRX*_Period=(IDLE_Mode_ *DRX*_Period div Paging_Group_Count)*(ID) mod(Paging_Group_Count);

wherein SFN is system frame number,
Idle_Mode_DRX_Period is the discontinuous reception period,
Paging_Group_Count is the number of paging groups, and
ID is the identifier of the user equipment which comprises an international mobile subscriber identity of the user equipment or a value derived from the international mobile subscriber identity.

2. The method of claim 1, wherein the indication of the discontinuous reception period is a three bit indication i such that $2^i$=Idle_Mode_DRX_Period; and the indication of the number of paging groups is a three bit indication n such that $2^n$=Paging_Group_Count.

3. The method of claim 1, further comprising receiving an indication of a paging occasion offset for shifting paging occasions, and wherein the determined paging occasions are shifted by the indicated paging occasion offset.

4. The method of claim 3, wherein the predetermined formula comprises:

$$(SFN - DRX\_offset\_parameter) \bmod (Idle\_Mode\_DRX\_Period) = \left(\frac{Idle\_Mode\_DRX\_Period}{Paging\_Group\_Count}\right) * (ID) \bmod (Paging\_Group\_Count)$$

wherein SFN is system frame number,
DRX_offset parameter is the paging occasion offset,
Idle_Mode_DRX_Period is the discontinuous reception period,
Paging_Group_Count is the number of number of paging groups, and
ID is the identifier of the user equipment which comprises an international mobile subscriber identity of the user equipment or a value derived from the international mobile subscriber identity.

5. The method of claim 1, further comprising:
receiving an indication of a paging indication subframe count; and
restricting the paging occasions to span less than a frame based at least in part on the paging indication subframe count.

6. The method of claim 5, further comprising:
receiving an indication of an offset of the paging occasion subframe count; and
offsetting, from an end of the frame, the paging occasions that are restricted to span less than the frame, based at least in part on the offset of the paging occasion subframe count.

7. The method of claim 1, wherein monitoring the control channel during the determined paging occasions further comprises monitoring a physical downlink control channel for a temporary identifier assigned to the user equipment, and
wherein the method further comprising, for the case where the temporary identifier is received on the monitored control channel during one of the paging occasions, receiving, at the user equipment, a page on a paging channel that is identified by the temporary identifier on the physical downlink control channel.

8. An apparatus comprising at least one processor; and at least one memory including computer program code, the at least one memory and the computer program code configured to, with the at least one processor, cause the apparatus to perform at least the following:
to receive an indication of a discontinuous reception period and an indication of a number of paging groups;
to determine paging occasions for the apparatus by applying the discontinuous reception period, the number of paging groups and an identifier of the apparatus to a predetermined formula; and
to monitor a control channel during the determined paging occasions,
wherein the predetermined formula comprises:

SFN mod IDLE_Mode_*DRX*_Period=(IDLE_Mode_ *DRX*_Period div Paging_Group_Count)*(ID) mod(Paging_Group_Count);

wherein SFN is system frame number,
Idle_Mode_DRX_Period is the discontinuous reception period, Paging_Group_Count is the number of paging groups, and ID is the identifier of the apparatus which comprises an international mobile subscriber identity of the apparatus or a value derived from the international mobile subscriber identity.

9. The apparatus of claim 8, wherein the indication of the discontinuous reception period is a three bit indication i such that $2^i$=Idle_Mode_DRX_Period; and the indication of the number of paging groups is a three bit indication n such that $2^n$=Paging_Group_Count.

10. The apparatus of claim 8, wherein the at least one memory and the computer program code are further configured to cause the apparatus to receive an indication of a paging occasion offset for shifting all paging occasions, and wherein the processor is configured to determine paging occasions by shifting according to the indicated paging occasion offset.

11. The apparatus of claim 10, wherein the predetermined formula comprises:

$$(SFN - DRX\_offset\_parameter) \bmod (Idle\_Mode\_DRX\_Period) = \left(\frac{Idle\_Mode\_DRX\_Period}{Paging\_Group\_Count}\right) * (ID) \bmod (Paging\_Group\_Count)$$

wherein SFN is system frame number,
DRX_offset parameter is the paging occasion offset,
Idle_Mode_DRX_Period is the discontinuous reception period,
Paging_Group_Count is the number of number of paging groups, and
ID is the identifier of the apparatus which comprises an international mobile subscriber identity of the apparatus or a value derived from the international mobile subscriber identity.

12. The apparatus of claim 8, wherein the receiver is further configured the at least one memory and the computer program code are further configured to cause the apparatus to receive an indication of a paging indication subframe count, and the processor is configured to use the paging indication subframe count so as to restrict the paging occasions to span less than a frame.

13. The apparatus of claim 12, wherein the at least one memory and the computer program code are further configured to cause the apparatus to receive an indication of an offset of the paging occasion subframe count, and the processor is configured to use the offset of the paging occasion subframe count to offset from an end of the frame the paging occasions that are restricted to span less than the frame.

14. The apparatus of claim 8, wherein, when monitoring the control channel during the determined paging occasions, the at least one memory and the computer program code are further configured to cause the apparatus to monitor a physical downlink control channel for a temporary identifier assigned to the apparatus, and
wherein, for the case where the receiver receives the temporary identifier on the monitored control channel during one of the paging occasions, the at least one memory and the computer program code are further configured to cause the apparatus to receive a page on a paging channel that is identified by the temporary identifier on the physical downlink control channel.

15. A non-transitory computer readable memory embodying a computer program that is executable by a digital processor to perform actions directed to monitoring for a page, the actions comprising:
in response to receiving indications of a discontinuous reception period and of a number of paging groups, determining paging occasions for a user equipment by applying the indicated discontinuous reception period, the indicated number of paging groups and an identifier of the user equipment to a predetermined formula; and
monitoring a control channel during the determined paging occasions,
wherein the predetermined formula comprises:

$$SFN \bmod IDLE\_Mode\_DRX\_Period = (IDLE\_Mode\_DRX\_Period \operatorname{div} Paging\_Group\_Count) * (ID) \bmod (Paging\_Group\_Count);$$

wherein SFN is system frame number,
Idle_Mode_DRX_Period is the discontinuous reception period,
Paging_Group_Count is the number of paging groups, and
ID is the identifier of the user equipment which comprises an international mobile subscriber identity of the apparatus or a value derived from the international mobile subscriber identity.

16. The non-transitory computer readable memory of claim 15, wherein monitoring the control channel during the determined paging occasions further comprises monitoring a physical downlink control channel for a temporary identifier assigned to the user equipment, and
wherein the actions further comprise, for the case where the temporary identifier is received on the monitored control channel during one of the paging occasions, receiving a page on a paging channel that is identified by the temporary identifier on the physical downlink control channel.

17. An apparatus comprising at least one processor; and at least one memory including computer program code, the at least one memory and the computer program code configured to, with the at least one processor, cause the apparatus to perform at least the following:
to transmit an indication of a discontinuous reception period and an indication of a number of paging groups;
to assign a temporary identifier to a user equipment and to determine at least one paging occasion for the user equipment by applying the indicated discontinuous reception period, the indicated number of paging groups and another identifier of the user equipment to a predetermined formula;
wherein the predetermined formula comprises:

$$SFN \bmod IDLE\_Mode\_DRX\_Period = (IDLE\_Mode\_DRX\_Period \operatorname{div} Paging\_Group\_Count) * (ID) \bmod (Paging\_Group\_Count);$$

wherein SFN is system frame number,
Idle_Mode_DRX_Period is the discontinuous reception period,
Paging_Group_Count is the number of paging groups, and
ID is the another identifier of the user equipment which comprises an international mobile subscriber identity of the user equipment or a value derived from the international mobile subscriber identity.

18. The apparatus of claim 17, where the apparatus is further configured to send to the user equipment the assigned temporary identifier on a physical downlink control channel during the determined at least one paging occasion; and
to send, to the user equipment, a page on a paging channel that is identified by the temporary identifier on the physical downlink control channel.

* * * * *